A. REYNOLDS.
MANUFACTURE OF STEEL.
APPLICATION FILED DEC. 13, 1909.
963,652.  Patented July 5, 1910.
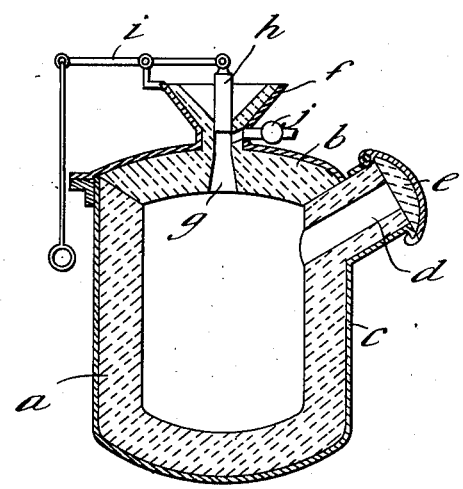

UNITED STATES PATENT OFFICE.

ALLEYNE REYNOLDS, OF LONDON, ENGLAND.

MANUFACTURE OF STEEL.

963,652.   Specification of Letters Patent.   Patented July 5, 1910.

Application filed December 13, 1909. Serial No. 532,876.

*To all whom it may concern:*

Be it known that I, ALLEYNE REYNOLDS, a subject of the King of Great Britain, residing at Birkbeck Bank Chambers, Southampton Buildings, in the county of London, England, electrometallurgist, have invented certain new and useful Improvements in the Manufacture of Steel, of which the following is a specification.

The object of this invention is to obtain steel of any desired character from a charge of suitable constituents and proportions by dead melting as in the ordinary crucible process, and to effect this the reduction and alloying of the charge is conducted under conditions which preclude any injurious reactions between the charge and the lining and slag in contact therewith at the temperature necessary for the completion of the reactions between the oxidized charge of iron and the alloying and reducing materials.

The dead melting is effected in a ladle, crucible or furnace having a lining or hearth which is at once chemically inert and sufficiently refractory, and under a slag which is either inert or acts beneficially as a deoxidizer. In obtaining such linings and slags I take advantage of the fact that the three very refractory basic substances, alumina, lime, and magnesia, are not attacked by the desirable constituents of steel at steel making temperatures. Further these substances and also silica are not peroxidizable, and consequently these substances or mixtures thereof with silica will not act catephorically to transmit oxygen from the atmosphere or furnace gases to the charge of steel, and while it is to be noted that silica is itself attackable by the desirable constituents of steel, it is not attacked, or only to a slight extent, when combined with one or more of the bases mentioned to form a basic mixture.

In carrying my invention into practice I also, when desirable, reduce still further the possibility of transference of atmospheric gases by conducting the dead melting *in vacuo*, and a further advantage of doing so resides in the tendency to eliminate occluded gases and to increase the reducing power of carbon at furnace temperatures *in vacuo*.

Primarily therefore my invention consists in conducting the final treatment of steel in vessels having linings composed of lime, magnesia, calcined dolomite, or neutral or slightly basic silicate of alumina, and under a slag of a corresponding character. If the lining be silicate of alumina, the slag will consist of silicate of alumina rendered fusible by means of fluxes such as silicate or chlorid of lime or soda. If the lining is of lime, dolomite or of magnesia, the slag employed will be more or less complex silicate of lime, magnesia, and alumina together with a flux or fluxes such as above mentioned which will produce a slag sufficiently fusible and also inert with respect to the furnace lining.

In manufacturing steel according to my invention a charge of steel having somewhat less alloy than that finally desired, which has been produced by the ordinary basic or acid processes, is tapped or teemed into a ladle, the oxidizing slag being excluded from the ladle or being soon afterward teemed from the charge contained therein. I prefer to use a ladle of special construction which is shown in section in the accompanying drawing and consists of a body portion $a$ or ladle proper and a lid $b$. The iron casing $c$ of the ladle is lined with one of the before mentioned refractory substances and is provided with a neck $d$ similarly lined. The neck $d$ is provided with a lid $e$ which is lined preferably with plumbago and suitable provision is made for securing the lid $e$ on the neck to close it air-tight. The lid $b$ of the ladle is also preferably lined with plumbago although other materials may be employed provided the lid lining, if acid, is separated by a neutral ring from the ladle lining should the latter be basic. Provision is made for effecting an air-tight joint between lid and ladle. Surmounting the lid $b$ is a hopper $f$ which is lined preferably with plumbago and communicates with the interior of the ladle by an aperture $g$ in the lid which can be closed by means of a plug $h$ actuated by a lever $i$ or other suitable means. A pipe connection $j$ fitted with a stop cock may be provided leading to the interior of the ladle and adapted to be coupled with a suitable pump or other exhausting apparatus whereby a vacuum may be produced within the ladle.

Prior to the charge being introduced into the ladle, both ladle and lid are heated to as high a temperature as possible short of the temperature of fluxing of the lining and this may be effected electrically or otherwise. The most convenient way usually would be to invert the ladle and the lid over suitable furnaces so as to form the lids thereof, and afterward joining the ladle and lid quickly and making an air-tight joint. The lid e of the charging neck is then thrown back and a charge of steel teemed into the ladle from the ordinary process steel furnace, silicon, manganese and other alloys being added either simultaneously with the stream of metal from the furnace or previously. The slag from the furnace is either prevented entering the ladle or it is poured off immediately the ladle is charged, the lid e being then closed and sealed. Any gases generated in the ladle are allowed to escape by raising the stopper h, or the latter may be arranged as a relief valve to lift at a predetermined pressure. The pipe j is then coupled with the exhausting apparatus and a vacuum produced.

A covering of melted slag of suitable constitution and free from iron as explained above is added either immediately or at any suitable time prior to casting. During this period also I add the additional amount of alloy necessary to produce steel of the desired character the necessary amount being determined by testing a sample of the steel taken from the vessel, and being introduced through the hopper either in the form of powder if small in amount or after previous melting.

In order to allow for the loss of heat due to radiation from the vessel during the protracted treatment, the original charge of steel will have to be preheated to a high temperature to compensate for radiation losses, particularly when the charge is a comparatively small one. When the dead melting treatment is completed the contents of the vessel are teemed into a well heated casting ladle of ordinary type and cast in the usual manner.

In cases in which more prolonged dead melting treatment is necessary than the above described procedure admits or when the charge mixture includes costly and easily oxidizable components, the contents of the vessel are transferred for further treatment to an ordinary open hearth or other suitable furnace. In this case the adjustment of the alloy content is not carried out while the charge is in the dead melting ladle but when in the furnace, and a much greater quantity of slag is used, and in order to insure that no injurious gases will be transferred from the furnace atmosphere through the slag I also prefer to add to the surface of the slag from time to time small quantities of carbon.

When the costly alloying material is only a small proportion of the total charge it may be added as scrap in small portions from time to time so that it sinks at once below the protecting slag and is thereby screened from the furnace gases. If however such material should be a considerable proportion of the charge, I charge it into the furnace in a compact form prior to introducing the fluid contents of the dead melting ladle and heat it to a temperature short of that at which it will scale. Then the fluid contents of the ladle are charged into the furnace, the fluid steel surrounding the solid alloying material and the fluid slag covering the whole charge.

When the crucible or furnace lining is made of any of the three basic materials hereinbefore specified, the lining is built up in the ordinary way, but when the lining consists of neutral or slightly basic silicate of alumina (and the slag is of corresponding composition) it cannot be constructed in the usual manner. In such case I first make an outer lining of good quality fire-brick, i. e. acid silicate of alumina, and by means of the furnace gases I heat this up to a point of incipient fusion. I then dust this over with a pure form of alumina sufficient in quantity to combine with the softening fire clay and form a neutral or slightly basic silicate of alumina, which when free from alkali is most refractory. I then increase the furnace temperature and by fritting powdered silicate of alumina on to the foundation formed in the manner described I build up the hearth or lining in the ordinary way in which silica hearths are made. If necessary a trace of alkali may be mixed with the powdered silicate of alumina to enable it to be fritted. The lining may also be built up to the requisite thickness by adding such a powdered mixture of silica sand, good fireclay, and alumina as will give a substantially neutral or basic product, the more readily fusible fireclay acting as a solvent for the other constituents of the mixture, which are thus enabled to combine and form a most refractory silicate of alumina lining or hearth which is either quite free or practically free from alkali. In like manner, the lining of the ladle may be coated, employing the oxy-coal gas or water-gas, or oxy-acetylene flame as a means of fusing on and building up a lining of the required character. The melted slags may be prepared advantageously in vessels similarly lined, but inasmuch as they can be formed in plumbago lined vessels causing very little wear to the latter, and as the latter admit of very high temperatures, they are well adapted to the purpose.

In the case of employment of slags consisting of silicates of lime or magnesia, it is important to eliminate completely any carbonic acid from the basic constituent, to render them non-oxidizing to the constituents of steel and such slags may be well made in plumbago lined cupolas or gas, or electric, open hearth furnaces. In the case of employment of slags consisting largely of silicate of alumina, it is difficult to obtain raw materials free from iron, which should not be a constituent of the slag. In the latter case, I treat the materials in an electric furnace or a blast furnace or cupola, somewhat as if I were employing aluminous iron ore for the production of a pig iron. I add the required materials and fluxes and keep tapping off at the bottom of the furnace the impure iron produced, while I tap the slag as and when required from a higher level. For this purpose plumbago linings will answer admirably.

Having thus described the nature of my said invention and the best means I know of carrying the same into practical effect, I claim:—

1. The herein described process for manufacturing steel of any desired composition which consists in introducing a melted charge of steel having oxygen in solution together with alloying materials into a vessel having a lining chemically inert to the charge, excluding the atmosphere from said vessel, introducing the components of a slag which is chemically inert to the charge of steel and to the lining, allowing the charge to remain in the vessel until the reactions between charge and alloying materials are complete, and finally teeming the steel for casting.

2. The herein described process for manufacturing steel of any desired composition which consists in preheating a vessel having a lining which is refractory and at the same time chemically inert at furnace temperatures to a charge of steel having oxygen in solution and to the materials required to reduce and alloy it, introducing into the vessel the said charge of steel and a quantity of alloying materials somewhat less than is necessary to produce the desired steel, excluding the atmosphere from the vessel, introducing into the vessel the components of a slag which is chemically inert to the charge of steel and to the lining, adding the additional alloying materials necessary to produce the desired steel, and finally teeming the steel for casting, substantially as desired.

3. The herein described process for manufacturing steel of any desired composition which consists in introducing a melted charge of steel having oxygen in solution together with alloying materials into a vessel having a lining chemically inert to the charge, producing a partial vacuum in the vessel and excluding the atmosphere, introducing the components of a slag which is chemically inert to the charge of steel and to the lining, allowing the charge to remain in the vessel until the reactions between charge and alloying materials are complete, and finally teeming the steel for casting.

4. The herein described process for manufacturing steel of any desired composition which consists in dead melting a charge of steel having oxygen in solution in the liquid state together with alloying and reducing materials in a pre-heated vessel having a refractory lining inert to the charge, said vessel being sealed after the charge is introduced, introducing into the vessel the components of a slag inert to the charge and to the lining, transferring the charge and slag to a furnace having a similar refractory lining and adding additional alloying material to the furnace charge to the desired extent, substantially as described.

In testimony whereof I have signed my name to this specification in the presence of two subscribing witnesses.

ALLEYNE REYNOLDS.

Witnesses:
 WM. MERCER,
 P. MYERS.